United States Patent [19]

King

[11] Patent Number: 5,381,967
[45] Date of Patent: Jan. 17, 1995

[54] HOPPER WHICH IS VIBRATED SO AS TO DISPENSE PRODUCT

[75] Inventor: Alan M. King, Westmount, Canada

[73] Assignee: VKI Technologies Corporation, Westmount, Canada

[21] Appl. No.: 104,557

[22] Filed: Aug. 11, 1993

[51] Int. Cl.6 .................. B65D 83/06; B05B 17/04
[52] U.S. Cl. .................... 239/659; 239/683; 239/684; 222/161; 222/199; 222/232; 222/239
[58] Field of Search .............. 239/659, 681, 683, 684, 239/602, 272, 275, 280; 222/199, 196, 161, 233, 234, 333, 232, 239, 241, 413

[56] References Cited

U.S. PATENT DOCUMENTS

| | | | |
|---|---|---|---|
| 690,841 | 7/1902 | Degenhard | 56/68 |
| 2,076,851 | 4/1937 | Larsen | 222/196 |
| 2,323,864 | 7/1943 | Weyandt | 222/41 |
| 2,533,331 | 12/1950 | Skinner | 406/75 |
| 2,858,011 | 10/1958 | Wahl | 222/413 |
| 3,146,918 | 9/1964 | Williams | 222/199 |
| 3,232,492 | 2/1966 | Carrier, Jr. | 222/199 X |
| 3,286,886 | 11/1966 | Burgess, Jr. | 222/196 |
| 3,481,512 | 12/1969 | Scheffer et al. | 222/413 X |
| 3,495,710 | 2/1970 | Bely et al. | 222/199 X |
| 3,563,420 | 2/1971 | Ansley | 222/199 |
| 3,584,765 | 6/1971 | Orr, Jr. et al. | 222/199 X |
| 3,618,227 | 11/1971 | Breakell et al. | 222/199 X |
| 4,273,266 | 6/1981 | Snape | 222/199 |
| 4,450,983 | 5/1984 | Goodrich | 222/196 |
| 4,790,455 | 12/1988 | Dieringer et al. | 222/199 X |
| 4,844,289 | 7/1989 | Dumbaugh | 222/161 |
| 4,850,515 | 7/1989 | Cleland | 198/533 |
| 4,960,229 | 10/1990 | Dumbaugh | 222/161 |
| 4,974,751 | 12/1990 | King | 222/142 |
| 5,301,844 | 4/1994 | Ricciardi | 222/199 |
| 5,327,947 | 7/1994 | McGregor | 222/239 X |

*Primary Examiner*—Andres Kashnikow
*Assistant Examiner*—Lesley D. Morris
*Attorney, Agent, or Firm*—Hill, Steadman & Simpson

[57] ABSTRACT

A flexible hopper made of rubber or other suitable flexible material which is driven by a motor through an eccentric drive so as to cause the hopper and a drive auger to vibrate to more readily dispense product in the hopper. One or more flexible fingers are attached to the auger and are flexed as the auger rotates so as to further improve the flow characteristics of the materials in the hopper.

1 Claim, 1 Drawing Sheet

HOPPER WHICH IS VIBRATED SO AS TO DISPENSE PRODUCT

BACKGROUND OF THE INVENTION

1. Field of the Invention

This invention relates in general to dispensers and in particular to a novel flexible hopper that can be vibrated so as to dispense a product as, for example, for a beverage machine.

2. Description of Related Art

U.S. Pat. No. 4,974,751 discloses a coffee cream or product dispenser assembly.

U.S. Pat. No. 2,076,851 discloses an agitator for a hopper.

U.S. Pat. No. 2,323,864 discloses a vibratory feeder which has a chute.

U.S. Pat. No. 2,533,331 discloses a vibrator connected to a discharge tube.

U.S. Pat. No. 2,858,011 discloses a tube and auger which are vibrated.

U.S. Pat. No. 3,286,886 discloses a bowl-type vibratory feeder.

U.S. Pat. No. 4,450,983 has a dispensing platform which is vibrated.

U.S. Pat. No. 4,850,515 discloses a hopper which is shaken to move the material therein.

The hoppers of the prior art are generally made of stiff material such as steel or other relatively inflexible materials.

SUMMARY OF THE INVENTION

It is an object of the present invention to provide a flexible hopper which is provided with a discharge auger at its lower portion and wherein a motor drives the auger to dispense material from the hopper and wherein the hopper is made of flexible plastic materials such as rubber or other suitable flexible materials and the hopper is vibrated by the drive motor of the auger such that material in the hopper passes freely down through the hopper and auger.

The hopper is supported from a machine such as a beverage machine by support posts which allow the hopper and particularly the bottom portion, to be vibrated by the auger so as to dispense material such as coffee, powdered cream or other materials.

It is an object of the present invention to provide a flexible hopper with an auger which is driven by a motor which has an eccentric connection to the auger so as to cause the hopper and the auger to vibrate for dispensing product.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1:
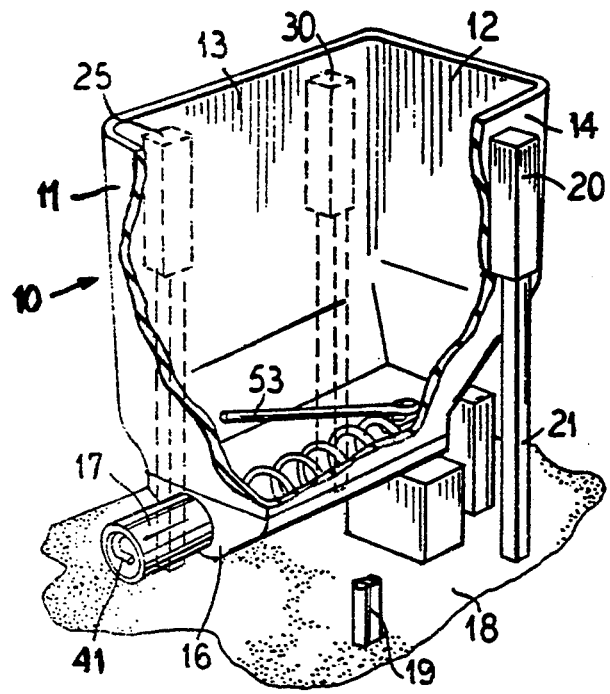
FIG. 1 is a partially cut-away perspective view of the novel flexible hopper and auger of the invention.
Figure 4:
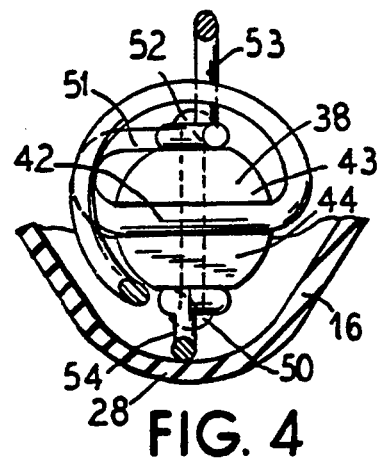
FIG. 4 is a sectional view taken on line IV—IV in FIG. 2.
Figure 2:
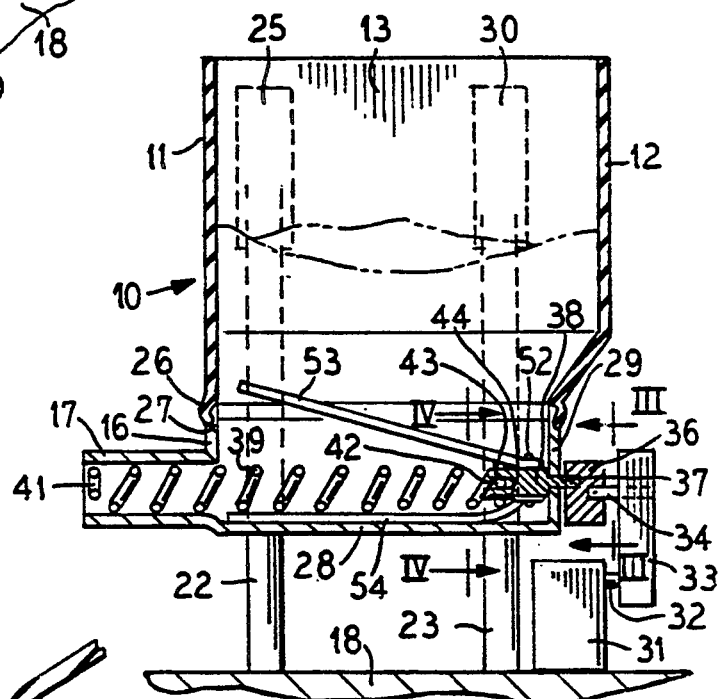
FIG. 2 is a sectional view illustrating the hopper and auger.

The Figures illustrate a flexible hopper 10 which has front wall 11 and back wall 12 and sidewalls 13 and 14 and which has a lower tapered portion 16 and an output spout 17 in which an auger 41 is rotatably mounted. The hopper 10 is supported by supports 19, 21, 22 and 23 which are received in socket members such as 20, 25 and 30 illustrated in FIGS. 1 and 2 so as to support the hopper from a support plate 18 which might be part of a beverage machine, for example. Since the supports 19, 21, 22 and 23 support the hopper 10 adjacent its upper edge, the lower portion of the hopper is free to move relative to the supports. The hopper 10 is made of flexible material such as rubber or other suitable plastic material so that it can flex and move as it is vibrated. The inner end 42 of the auger 41 is mounted in a slot of a driving bracket 38 which has sidewalls 43 and 44 on opposite sides of the slot and the end 51 of the auger 41 is connected to the bracket 38 by the slot as shown in FIG. 4. The lower end 26 of the hopper 10 fits over front wall 27 and back wall 29 of the lowered tapered portion 16 as shown in FIG. 2.

Figure 3:
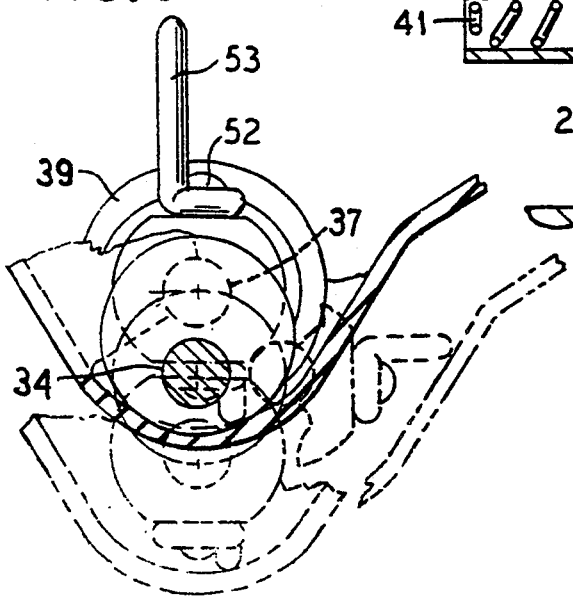
FIG. 3 is a detailed sectional view on line III—III in FIG. 2 through the auger in the lower portion of the hopper illustrating movement.

A pair of flexible finger members 53 and 54 are also attached to opposite sides of the bracket member 38 by 52 as shown, for example, in the Figures. As shown in FIGS. 1 and 2, flexible fingers 53 and 54 extend a substantial distance in the longitudinal direction of the auger. The bracket 38 has a shaft 37 that extends through the rear wall 12 of the hopper and is eccentrically connected to a disk 36 which receives an input shaft 34 from a reduction gear member 33. A motor 31 is mounted on the base plate 18 and has an output shaft 32 that supplies an input to the reduction gear member 33. As the motor 31 rotates to drive its output shaft 32, the output shaft 34 of the reduction gear means 33 rotates the eccentric disk 36 so as to rotate the auger 41 and also to impart vibratory movement to the hopper as is shown, for example, in FIG. 3. As the hopper rotates, the flexible fingers 53 and 54 also rotate therewith and periodically engage the bottom 28 of the lower portion of the hopper as shown in FIG. 4 so as to cause the fingers to be deflected to a position substantially parallel with the lower wall 28 as shown in FIGS. 2 and 4, for example. As the fingers rotate further, they flex up to the position of finger 53 shown in FIGS. 1 and 2 and engage the product in the hopper so as to loosen it so that it freely falls into the path of the auger 41 and can be discharged through the discharge chute 17. The vibratory motion caused by the drive motor 31 and the eccentric disk 36 causes the entire lower portion of the hopper to be vibrated which causes material in the hopper to be readily discharged and fall free into the auger due to the vibration and also due to the flexible fingers 53 and 54.

It is seen that this invention provides an improved hopper made of flexible material which can be vibrated so as to prevent packing of product in the hopper.

Although the invention has been described with respect to preferred embodiments, it is not to be so limited as changes and modifications can be made which are within the full intended scope of the invention as defined by the appended claims.

I claim as our invention:

1. A hopper for dispensing product comprising: a hopper having upper side walls and a lower tapered portion, wherein said entire hopper, including said upper side walls and said lower tapered portion, is made of a flexible plastic material to allow it to freely move; an auger rotatably mounted in said lower portion of said hopper which has a discharge opening; support means attached to said upper side walls of said hopper to support said hopper; driving means coupled to said auger to rotate it so as to move product in the longitudinal direction of said hopper, wherein said driving means is eccentrically mounted relative to said auger on a base and an eccentric coupling is mounted between said driving means and said auger so that as said driving means rotates, said auger and said lower tapered portion of said hopper in which the auger is mounted and said upper side walls of said hopper are vibrated; wherein said support means comprise a plurality of posts with first ends mounted on said base and second ends attached to the upper portions of said upper side walls of said hopper thereby providing said support for said hopper with the lower portion positioned above said base for allowing free movement of the lower tapered portion in response to vibration; and including a plurality of flexible fingers attached to said auger so as to rotate therewith, said flexible fingers extending for a substantial distance in the longitudinal direction of said auger such that product in said hopper is readily discharged and falls free into said auger due to the free movement of said lower portion of said hopper and the vibration of said upper side walls of said hopper and the rotation of said plurality of flexible fingers so as to prevent packing of product in said hopper.

* * * * *